(No Model.)
L. N. DENNEY & A. C. JOHNSON.
APPARATUS FOR DRAWING AND REPLACING BOILER TUBES.
No. 254,287. Patented Feb. 28, 1882.
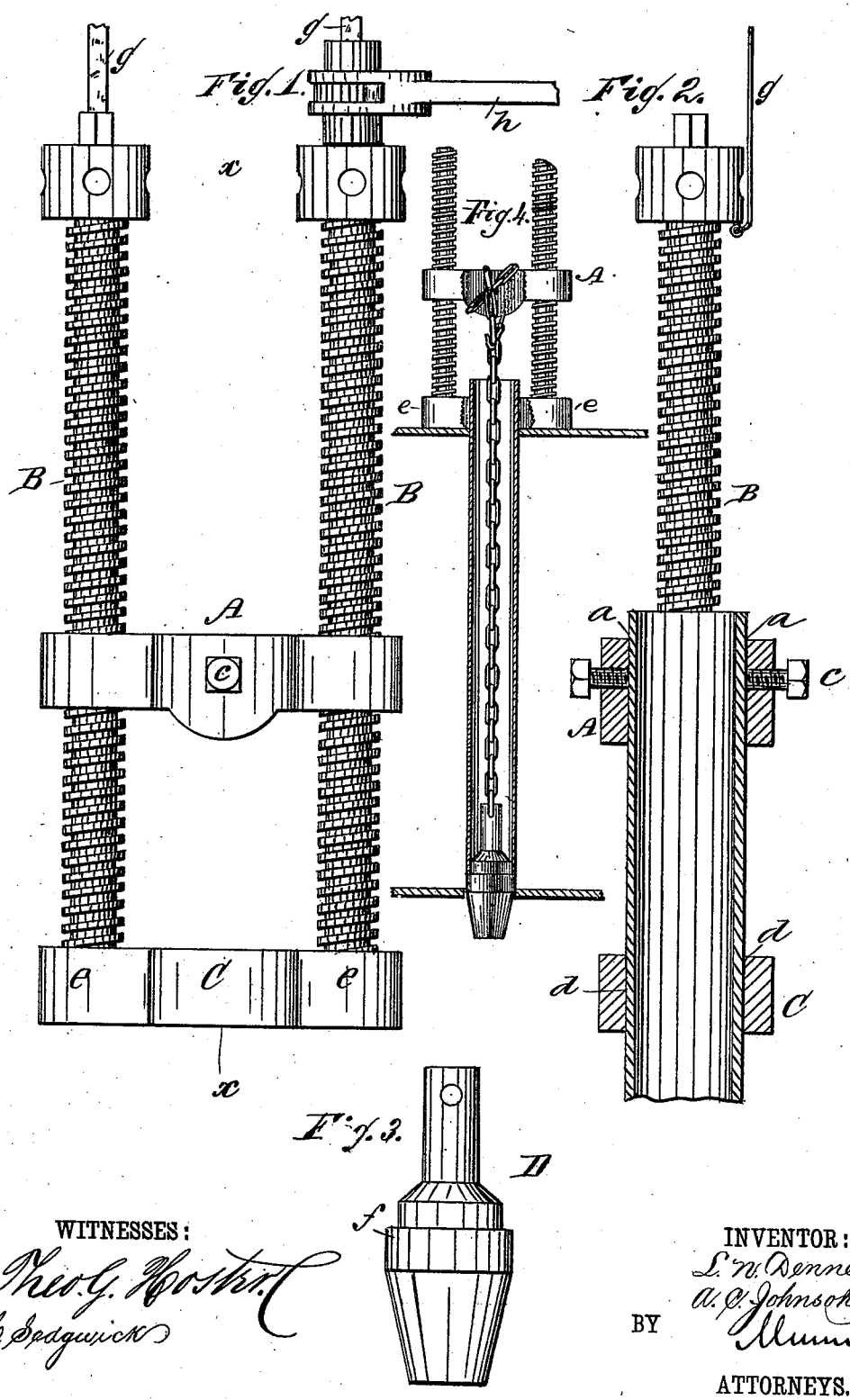

UNITED STATES PATENT OFFICE.

LEONZO N. DENNEY AND ALBERT C. JOHNSON, OF WILMINGTON, DELAWARE.

APPARATUS FOR DRAWING AND REPLACING BOILER-TUBES.

SPECIFICATION forming part of Letters Patent No. 254,287, dated February 28, 1882.

Application filed January 6, 1882. (No model.)

*To all whom it may concern:*

Be it known that we, LEONZO N. DENNEY and ALBERT C. JOHNSON, of Wilmington, in the county of New Castle and State of Delaware, have invented a new and useful Improvement in Apparatus for Drawing and Replacing Boiler-Tubes, of which the following is a full, clear, and exact description.

The object of our invention is to lessen the time and labor usually required for removing tubes from boilers and in replacing them, which with the appliances generally employed is a laborious operation.

The invention consists in a jacking apparatus operating by screws, as hereinafter described and claimed.

Reference is to be had to the accompanying drawings, forming part of this specification, in which similar letters of reference indicate corresponding parts in all the figures.

Figure 1 is a side view of the apparatus. Fig. 2 is a longitudinal section, showing the apparatus as attached to a tube; and Fig. 3 is an elevation of the starting-plug. Fig. 4 is a side view, partly broken away, showing it in position and the yoke connected by means of a chain with the plug.

A is a head or yoke, having a central aperture, $a$, of a size for passing freely upon the tube.

B B are screws fitted through threaded apertures in the ends of yoke A, and formed on their upper ends with socketed heads for the bars or levers by which the screws are turned. $c$ is a set-screw tapped through the side of aperture $a$.

C is a block, having a central aperture, $d$, corresponding to the aperture in yoke A, and this block is also formed with sockets or steps $e\ e$ for receiving the ends of screws B.

D is the starting-plug, of a size for entering the tubes, and formed with an enlargement or shoulder, $f$, to take against the ends of the tubes. This plug also has a hole at the smaller end, or other device for connection of a chain, which will pass through the tube and be connected to yoke A.

In using the apparatus the block C is placed against the boiler-head, with its aperture $d$ over the tube. A chain from yoke A is passed through the tube and connected to plug D, and the screws being then turned, the chain is drawn on and the tube thus started. As soon as the tube is drawn far enough to receive the yoke A the chain and plug are removed, the yoke clamped to the tube by the set-screw $c$, and the screws operated as before to draw out the tube to the length of the screws, the operation being repeated until the tube is free. This can be done without injury to the boiler and in a comparatively short space of time. To replace a tube the operations are reversed.

On the ends of screws B straps $g\ g$ are shown. These are for holding the extractor in position until the tube is drawn far enough to be clamped in the yoke. I have also shown the outer ends of screws B squared to receive a ratchet-lever, $h$, that is to be used for turning the screws rapidly and conveniently when full power is not required.

Having thus fully described our invention, we claim as new and desire to secure by Letters Patent—

1. The tube extractor and replacer, consisting of apertured yoke A, screws B, and set-screw $c$, substantially as shown, combined for operation as specified.

2. In tube-extractors, the block C, having aperture $d$, combined with yoke A, provided with set-screw $c$ and screws B, substantially as and for the purposes set forth.

3. The starting-plug D, having shoulder $f$, in combination with the yoke A, screws B, and means for connecting yoke and plug, substantially as and for the purposes set forth.

LEONZO N. DENNEY.
ALBERT C. JOHNSON.

Witnesses:
THEODORE M. SMEDLEY,
LEVI A. BERTOLETTE.